United States Patent Office 2,862,358
Patented Dec. 2, 1958

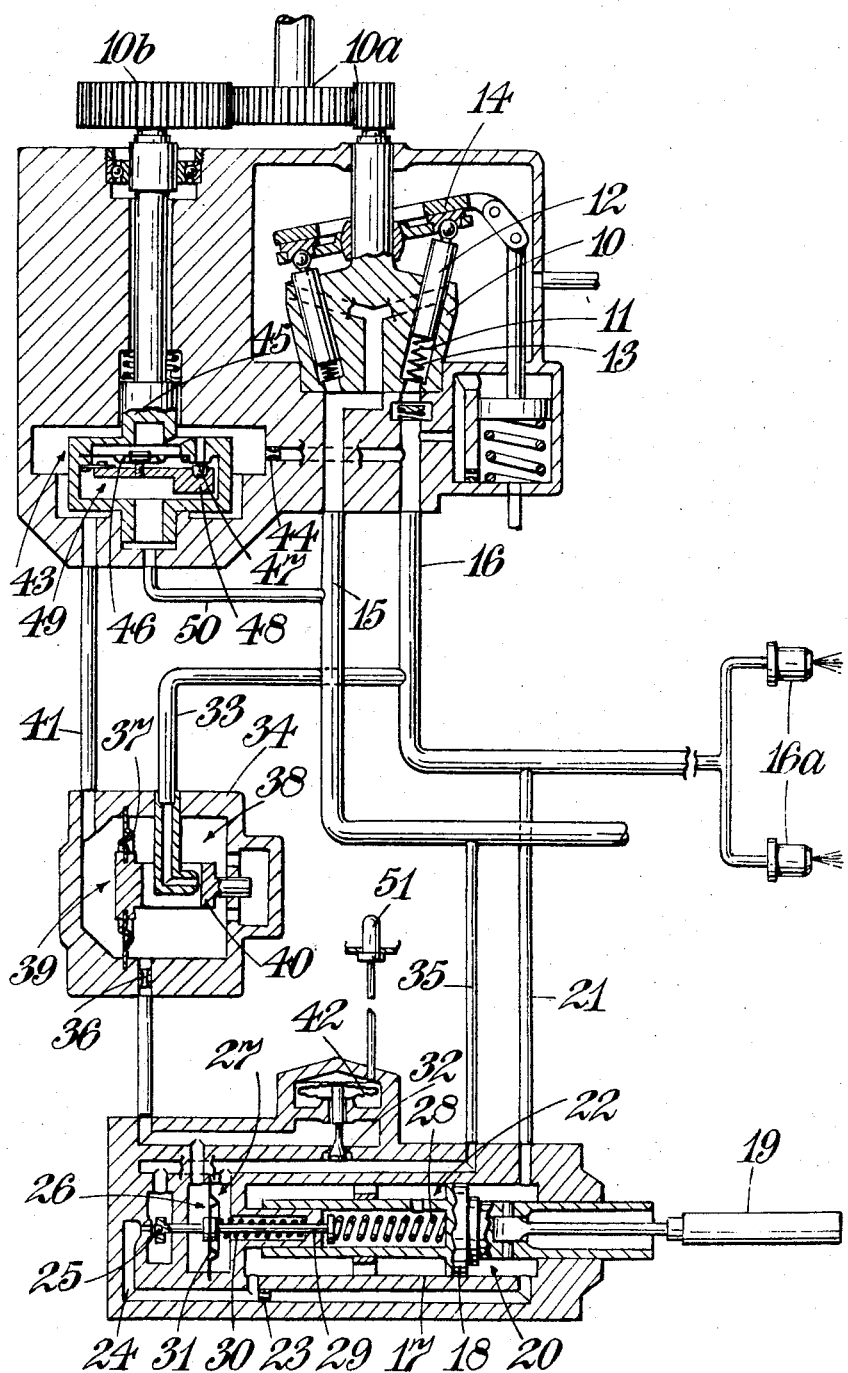

2,862,358

MECHANISMS FOR PRODUCING HYDRAULIC PRESSURE SIGNALS

Kenneth Arnold Basford, Alvaston, Derby, England, assignor to Rolls-Royce Limited, Derby, England, a British company Application August 22, 1955, Serial No. 529,612

Claims priority, application Great Britain September 8, 1954

14 Claims. (Cl. 60—39.29)

This invention relates to hydraulic mechanisms for producing hydraulic pressure signals.

The hydraulic mechanism may, for instance, be employed to inject a signal into an engine control mechanism which is required to effect a control in accordance with the rotational speed of the engine. In gas-turbine engines, such as are employed for aircraft propulsion, there are often provided adjustable inlet guide vanes, or adjustable stator blades, or bleed valves which are required to be adjusted in accordance with engine rotational speed or the square of the engine rotational speed, and the adjustment is effected by a ram the operation of which is controlled by a hydraulically-produced force bearing a given relationship to the engine rotational speed.

This invention has for an object to provide an improved hydraulic mechanism for producing a pressure signal from which such a force can be derived.

According to the present invention, a hydraulic mechanism for producing a pressure signal related to a rotational speed comprises means to produce a liquid pressure which exceeds a low pressure by an amount related in a predetermined manner to the rotational speed, a conduit connected to said liquid-pressure-producing means and leading to a region at said low pressure, and a pair of restrictors arranged in series in said conduit, the pressure signal being the pressure drop across one only of said restrictors.

In this manner the flow through the conduit is related to the rotational speed, and thus the pressure drop across said one of said restrictors is a function only of the speed for a given area of said restrictor. By variation of the area of said one restrictor the pressure drop may additionally be a function of an independent variable in accordance with which the area of the restrictor is controlled.

For example the liquid pressure may exceed the low pressure by an amount proportional to the square of the rotational speed of an engine, in which case the pressure drop across said one restrictor will also be proportional to the square of the speed for a given area of the restrictor, and the area may be varied in accordance with engine intake temperature in such a manner as to modify the flow so that the pressure drop across said one restrictor is proportional to the corrected rotational speed, i. e. the actual speed divided by the square root of the intake temperature.

In certain cases it may be undesirable to tap off a flow of liquid from the means to produce a liquid pressure, and thus according to a feature of the present invention, a hydraulic mechanism for producing a pressure signal related to a rotational speed may comprise a source of liquid under pressure, a conduit connected to said source and leading to a region of low pressure, a pair of restrictors arranged in series in said conduit, a pressure-reducing valve in the conduit upstream of the restrictors, and means to produce a liquid pressure which exceeds the low pressure by an amount related to the rotational speed, said valve being loaded in the sense to close it by the pressure just upstream of said restrictors and being loaded in the opposite sense by said liquid pressure. Preferably the valve is loaded in the two senses over the same effective area. The pressure-reducing valve is thus controlled so that the pressure upstream of the restrictors is proportional to or is equal to the liquid pressure and the pressure drop across the restrictors thus bears a desired relation to the rotational speed.

Conveniently the valve is connected to a diaphragm which is loaded on one side by the pressure upstream of the restrictors and on the other side by the liquid pressure.

Conveniently, moreover, the upstream restrictor is a fixed restrictor and the downstream restrictor is either a fixed restrictor, or a variable restrictor which is varied in accordance with temperature, for example so that the pressure drop across it is in accordance with the corrected rotational speed $N/\sqrt{T_1}$ (where N is the actual speed and $T_1$ the intake temperature) rather than the actual rotational speed.

One embodiment of control including a hydraulic mechanism in accordance with this invention will now be described with reference to the accompanying drawing.

The drawing shows the hydraulic mechanism in association with a fuel pump of a gas-turbine engine and with an hydraulic ram which is to be controlled in operation of the hydraulic mechanism.

The pump comprises a rotor body 10 driven from the engine through a driving connection 10a and formed with a series of bores 11 containing plungers 12 which, on rotation of the rotor body, are reciprocated in the bores 11 under control of springs 13 and a swash-plate mechanism 14, the angle of inclination of which to the axis of rotation of the rotor body is variable to vary the rate of delivery of the pump. The bores 11 of the pump are connected to a suction pipe 15 during part of each revolution of the pump and to a delivery pipe 16 during a second part of each revolution. The suction pipe 15 is usually supplied with fuel at a low pressure from a tank by means of a booster pump (not shown). The delivery pipe 16 is usually connected to fuel injectors 16a in combustion equipment and usually contains fuel supply control devices (not shown).

The ram, which may be used for adjusting inlet guide vanes or stator blades of an axial-flow compressor or bleed valves therefor, comprises a cylinder 17 and a differential-area piston 18 which is connected through a connecting rod 19 to the parts to be adjusted.

The chamber 20 facing the smaller-area end of the piston 18 is connected through a duct 21 direct to the delivery pipe 16 of the pump, and the chamber 22 facing the larger-area end of the piston 18 is connected to the duct 21 through a restrictor 23. The chamber 22 also has connected to it a bleed passage 24, the flow in which is controlled by a valve 25. On opening of the valve 25, the bleed flow increases and the pressure in the chamber 22 falls relative to that in chamber 20 so causing the piston 18 to move to the left. On closing of the valve 25, the bleed flow decreases and the pressure in the chamber 22 rises relative to that in chamber 20 so causing the piston 18 to move to the right.

The ram also contains a control mechanism for the valve 25, which comprises a flexible diaphragm 31 separating two chambers 26, 27, a spring 28 which has one abutment on the piston 18 and a second abutment on the diaphragm 31 through a push rod 29, and a second spring 30 which has an abutment on fixed structure and a second abutment on the diaphragm 31. The diaphragm 31 is loaded hydraulically in a sense opposite to the load due to the springs 28, 30, and so for each value of the pressure difference across the diaphragm 31 the piston 18 will take up a corresponding position in the cylinder 17. On increase of the pressure difference, the valve 25 is opened so reducing the pressure in chamber 22 and allowing the piston to move to the left increasing the load on the diaphragm 31 due to the spring 28. This movement continues until the loads on the diaphragm are again balanced.

The hydraulic load on the diaphragm is due to the pressure drop across a restrictor 32 in an hydraulic circuit, which comprises a duct 33 connected with the delivery pipe 16 and leading to a pressure-reducing valve 34, and a conduit 35 leading from the pressure-reducing valve 34 to the suction pipe 15 and containing the restrictor 32 and upstream of it a fixed-area restrictor 36.

The pressure drop across the restrictor 32 is controlled to a desired value, in this instance to be varied in accordance with the square of the engine rotational speed for a given area of the restrictor 32, by controlling the pressure drop across the two restrictors 32, 36 by means of the pressure-reducing valve 34.

The pressure-reducing valve 34 is divided by a flexible diaphragm 37 into two chambers 38, 39. The chamber 38 has the upstream end of the duct 35 connected to it and has the outlet end of duct 33 opening into it under control of a valve member 40 in the form of a stirrup carried by diaphragm 37. The chamber 39 is connected by a duct 41 to a hydro-mechanical governor of known form which is driven at a speed proportional to the engine rotational speed and produces a pressure which is equal to the pressure in the suction pipe 15 plus an amount proportional to the square of the speed and is substantially independent of the density of the liquid.

The hydro-mechanical governor comprises a chamber 43 which is connected through a restrictor 44 to the delivery pipe 16. There is a hollow rotor 45 which is connected by gear 10b to the driving connection 10a so as to be rotated at a speed proportional to the engine speed. The rotor 45 is arranged in the chamber 43 and contains a flexible diaphragm 46 and a centrifugal bobweight 48; the latter controls a valve 47 which in turn controls the flow from chamber 43 into a chamber 49 in the hollow rotor 45, and the chamber 49 is connected by duct 50 to the suction pipe 15. The diaphragm 46 is loaded on one side by the pressure in chamber 43 and on the other side by the pressure in chamber 49 which is the suction pipe pressure. The fluid load on the diaphragm 46 opposes the centrifugal load due to bobweight 48, and so the pressure in chamber 43 is equal to an amount proportional to the square of the rotational speed of the rotor 45 plus the pressure in the suction pipe 15. The duct 41 opens into the chamber 43.

The pressure generated in chamber 43 is conveyed to the chamber 39 and acts on diaphragm 37 to tend to lift the valve member 40. Thus the pressure in the chamber 38 which opposes lifting of the valve member 40 is maintained equal to that in the chamber 39. Since the conduit 35 is connected at its downstream end to the suction pipe 15 the pressure drop across both the restrictors 32, 36 is proportional to the square of the rotational speed. Furthermore the pressure drop across restrictor 32 is also, for any given area of the restrictor, proportional to the square of the speed.

The proportion may be varied by varying the ratio of the areas of the restrictors 32, 36, and if, as shown, the area of the restrictor 32 is varied in a suitable manner by a temperature-responsive capsule 42 acted upon by a temperature-sensitive element 51 subjected to the intake temperature of the engine or to atmospheric temperature, to increase the area of the orifice 32 on increase of said temperature, the pressure across the restrictor 32 may be controlled to vary in accordance with $N^2/T_1$ which is a function of the corrected rotational speed $N/\sqrt{T_1}$.

I claim:

1. An hydraulic mechanism for producing a pressure signal related to a rotational speed comprising a source of liquid under pressure, a conduit connected to said source and leading to a region of low pressure, a pair of restrictors arranged in series in said conduit, a pressure-reducing valve in the conduit upstream of the restrictors, means producing a liquid pressure which exceeds the low pressure by an amount related to the rotational speed, and pressure-responsive means connected to said conduit between the pressure-reducing valve and the restrictors thereby to be loaded by the pressure in the conduit just upstream of said restrictors, said pressure-responsive means being connected to said means producing a liquid pressure exceeding the low pressure by an amount related to rotational speed to be oppositely loaded by said liquid pressure, and said pressure-responsive means being connected to the pressure-reducing valve to operate it, the load due to the pressure in the conduit upstream of the restrictors acting to close the valve and the load due to the liquid pressure which exceeds the low pressure by an amount dependent upon rotational speed operating to open the valve.

2. An hydraulic mechanism as claimed in claim 1, wherein the pressure-responsive means is a diaphragm which is loaded on one side by the pressure upstream of the restrictors and on the other side by the liquid pressure which exceeds the low pressure by an amount dependent upon rotational speed.

3. An hydraulic mechanism as claimed in claim 1, wherein the pressure-responsive means is loaded in the two senses over equal effective areas.

4. An hydraulic mechanism as claimed in claim 1, wherein one restrictor is a fixed restrictor and one is a variable restrictor.

5. An hydraulic mechanism as claimed in claim 4, wherein the downstream restrictor is the variable restrictor.

6. An hydraulic mechanism as claimed in claim 4, wherein the signal is employed to effect a control in accordance with the rotational speed of a gas-turbine engine, said liquid pressure upstream of the restrictors being related to the engine actual rotational speed and the area of said variable restrictor being varied in accordance with engine intake temperature, to give a pressure signal which varies in accordance with the corrected rotational speed of the engine.

7. An hydraulic mechanism for producing a pressure signal related to a rotational speed comprising a source of liquid under pressure, a conduit connected to said source and leading to a region of low pressure, a pair of restrictors arranged in series in said conduit, a pressure-reducing valve in the conduit upstream of the restrictors, means to produce a liquid pressure which exceeds the low pressure by an amount related to the rotational speed, pressure-responsive means connected in said conduit to be loaded in one sense by the pressure in the conduit between said pressure-reducing valve and the restrictors and also connected to said means producing a liquid pressure exceeding the low pressure by an amount related to the rotational speed, said pressure-responsive means being connected to the said valve so that the valve is loaded in the sense to close it by the pressure just upstream of said restrictors and is loaded in the opposite sense by said liquid pressure, and tapping means connected one to each side of one only of said restrictors, the difference in liquid pressures in said tapping means providing said pressure signal.

8. An hydraulic mechanism as claimed in claim 7, said pressure-responsive means comprising a diaphragm which is loaded on one side by the pressure upstream of the restrictors and on the other side by the liquid pressure, said valve being connected to said diaphragm.

9. An hydraulic mechanism as claimed in claim 7, wherein the said pressure-responsive means is loaded in the two senses over equal effective areas.

10. An hydraulic mechanism as claimed in claim 7, wherein one restrictor is a fixed restrictor and one is a variable restrictor.

11. An hydraulic mechanism as claimed in claim 10, wherein the downstream restrictor is the variable restrictor.

12. An hydraulic mechanism as claimed in claim 10, wherein the signal is employed to effect a control in accordance with the rotational speed of a gas-turbine engine, said liquid pressure upstream of the restrictors being related to the engine actual rotational speed and the area of said variable restrictor being varied in accordance with engine intake temperature, to give a pressure signal which varies in accordance with the corrected rotational speed of the engine.

13. A control system for a gas-turbine engine comprising a hydraulic mechanism for producing a pressure signal related to the rotational speed of the engine, said mechanism comprising a source of liquid under pressure, a conduit connected to said source and leading to a region of low pressure, a pair of restrictors arranged in series in said conduit, a pressure-reducing valve in the conduit upstream of the restrictors, and means to produce a liquid pressure which exceeds the low pressure by an amount related to the rotational speed, and pressure-responsive means connected to said conduit between the pressure-reducing valve and the restrictors thereby to be loaded by the pressure in the conduit just upstream of the restrictors, said pressure-responsive means being connected to said means producing a liquid pressure exceeding the low pressure by an amount related to rotational speed to be oppositely loaded by said liquid pressure, and said pressure-responsive means being connected to the pressure-reducing valve to operate it, the load due to the pressure in the conduit upstream of the restrictors acting to close the valve and the load due to the liquid pressure which exceeds the low-pressure by an amount dependent upon rotational speed operating to open the valve.

14. A control system for a gas-turbine engine comprising a hydraulic mechanism for producing a pressure signal related to the rotational speed of the engine, said mechanism comprising a source of liquid under pressure, a conduit connected to said source and leading to a region of low pressure, a pair of restrictors arranged in series in said conduit, a pressure-reducing valve in the conduit upstream of the restrictors, and means to produce a liquid pressure which exceeds the low pressure by an amount related to the rotational speed, and pressure-responsive means connected to said conduit between the pressure-reducing valve and the restrictors thereby to be loaded by the pressure in the conduit just upstream of the restrictors, said pressure-responsive means being connected to said means producing a liquid pressure exceeding the low pressure by an amount related to rotational speed to be oppositely loaded by said liquid pressure, and said pressure-responsive means being connected to the pressure-reducing valve to operate it, the load due to the pressure in the conduit upstream of the restrictors acting to close the valve and the load due to the liquid pressure which exceeds the low-pressure by an amount dependent upon rotational speed operating to open the valve and second pressure-responsive means connected to said conduit at each side of one of said restrictors thereby to be responsive to the pressure drop across said one of said restrictors and connected to effect a control action.

References Cited in the file of this patent
UNITED STATES PATENTS

| | | |
|---|---|---|
| 2,581,275 | Mock | Jan. 1, 1952 |
| 2,581,276 | Mock | Jan. 1, 1952 |
| 2,746,242 | Reed | May 22, 1956 |
| 2,785,848 | Lombard et al. | Mar. 19, 1957 |